(12) United States Patent
Matsunaga et al.

(10) Patent No.: US 9,076,081 B2
(45) Date of Patent: Jul. 7, 2015

(54) MULTI-CLASS DISCRIMINATING DEVICE

(71) Applicant: CASIO COMPUTER CO., LTD., Shibuya-ku, Tokyo (JP)

(72) Inventors: Kazuhisa Matsunaga, Fussa (JP);
Kouichi Nakagome, Tokorozawa (JP);
Michihiro Nihei, Mitaka (JP);
Masayuki Hirohama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/063,311

(22) Filed: Oct. 25, 2013

(65) Prior Publication Data

US 2014/0119646 A1    May 1, 2014

(30) Foreign Application Priority Data

Oct. 26, 2012   (JP) ................................ 2012-236440

(51) Int. Cl.
*G06K 9/62* (2006.01)

(52) U.S. Cl.
CPC ............ *G06K 9/6281* (2013.01); *G06K 9/6234* (2013.01); *G06K 9/6256* (2013.01)

(58) Field of Classification Search
USPC .................................. 382/159, 165, 170, 224
See application file for complete search history.

(56) References Cited

U.S. PATENT DOCUMENTS

2011/0295778 A1    12/2011   Homma et al.
2013/0322743 A1 *  12/2013   Matsunaga et al. ............ 382/159

FOREIGN PATENT DOCUMENTS

| JP | 2002-203242 A | 7/2002 |
| JP | 2009230751 A | 10/2009 |
| JP | 2011248636 A | 12/2011 |

OTHER PUBLICATIONS

Japanese Office Action dated Sep. 2, 2014, issued in counterpart Japanese Application No. 2012-236440.
Fukuda, et al., "Material Information Acquisition for Interactive Object Recognition", 17th Symposium on Sensing via Image Information Conference Paper Collection, Image Sensing Technology Research Association, Jun. 8, 2011, pp. IS4-19-1 to IS4-19-6.

* cited by examiner

*Primary Examiner* — Duy M Dang
(74) *Attorney, Agent, or Firm* — Holtz, Holtz, Goodman & Chick PC

(57) ABSTRACT

A multi-class discriminating device for judging to which class a feature represented by data falls. The device has a first unit for generating plural first hierarchical discriminating devices for discriminating one from N, and a second unit for combining score values output respectively from the plural first hierarchical discriminating devices to generate a second hierarchical feature vector and for entering the second hierarchical feature vector to generate plural second hierarchical discriminating devices for discriminating one from N. When data is entered, the plural first hierarchical discriminating devices output score values, and these score values are combined together to generate the second hierarchical feature vector. When the second hierarchical feature vector is entered, the second hierarchical discriminating device which outputs the maximum score value is selected. The class corresponding to the selected second hierarchical discriminating device is discriminated as the class, into which the feature represented by the entered data falls.

10 Claims, 12 Drawing Sheets

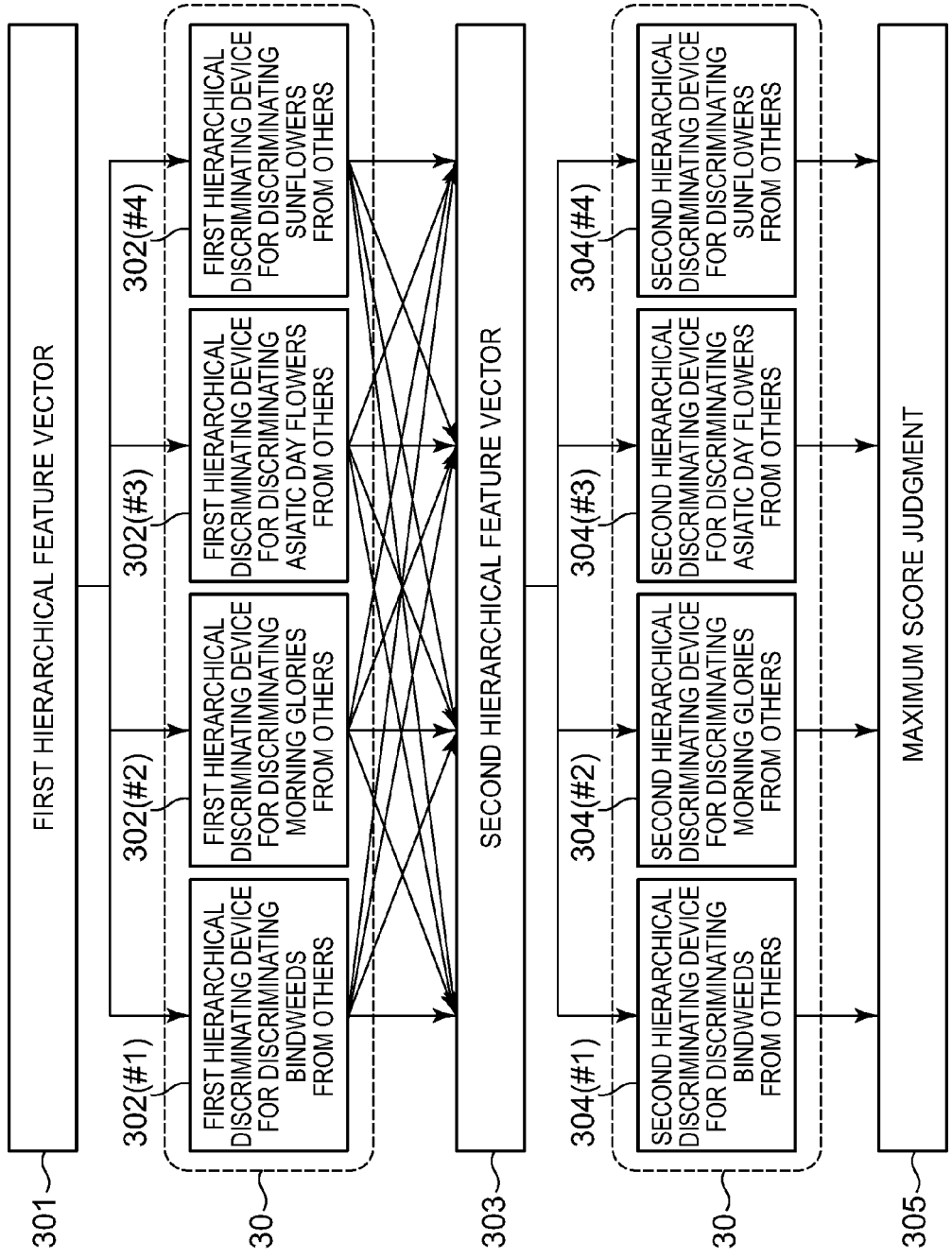

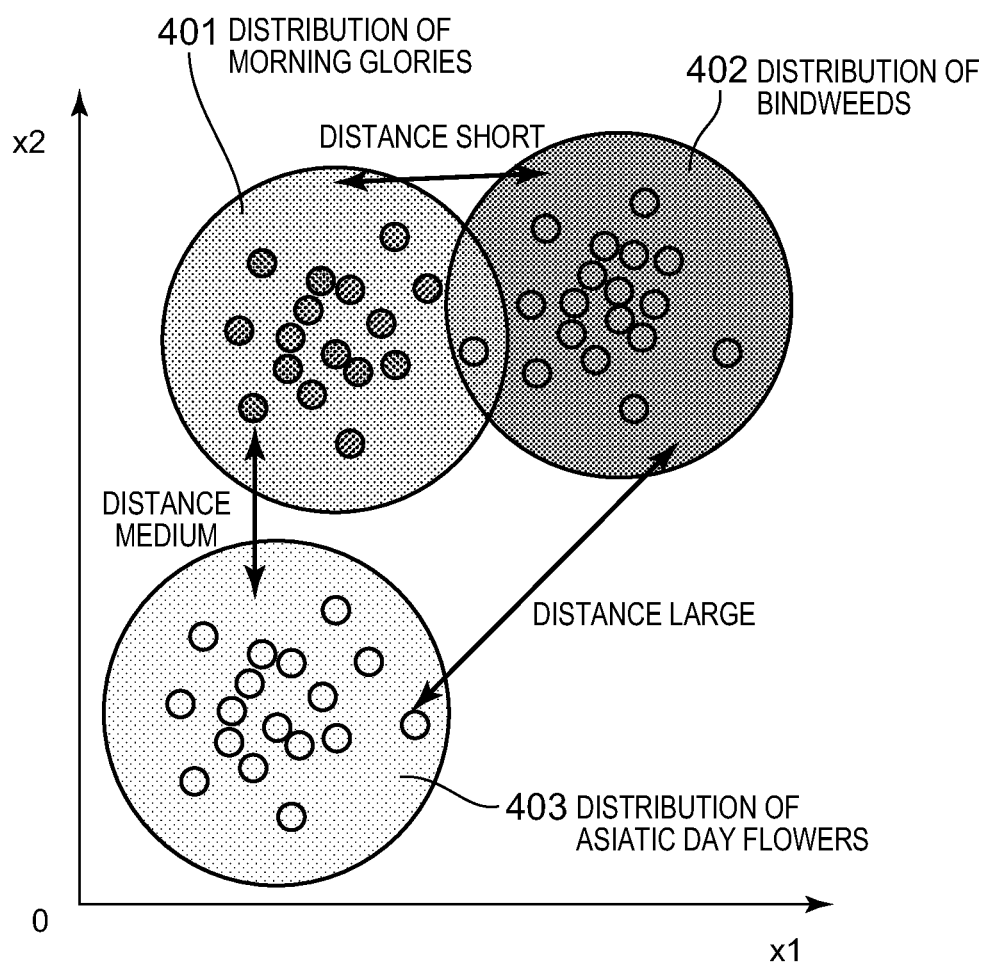

FIG. 5

| FIRST HIERARCHICAL DISCRIMINATING DEVICE | DEVICE FOR DISCRIMINATING BINDWEEDS FROM OTHERS | DEVICE FOR DISCRIMINATING MORNING GLORIES FROM OTHERS | DEVICE FOR DISCRIMINATING ASIATIC DAY FLOWERS FROM OTHERS | DEVICE FOR DISCRIMINATING SUNFLOWERS FROM OTHERS |
|---|---|---|---|---|
| SCORE VALUES OF FIRST DEVICE WITH SAMPLES OF MORNING GLORIES ENTERED | 0.8±0.5 | 0.9±0.5 | 0.5±0.5 | −0.5±0.5 |
| SCORE VALUES OF FIRST DEVICE WITH SAMPLES OF BINDWEEDS ENTERED | 0.9±0.5 | 0.8±0.5 | −0.5±0.5 | −0.5±0.5 |

FIG. 6

| FIRST DIMENSIONAL VALUE | SECOND DIMENSIONAL VALUE | THIRD DIMENSIONAL VALUE | FOURTH DIMENSIONAL VALUE |
|---|---|---|---|
| $x_1$: SCORE VALUE OF FIRST HIERARCHICAL DISCRIMINATING DEVICE #1 | $x_2$: SCORE VALUE OF FIRST HIERARCHICAL DISCRIMINATING DEVICE #2 | $x_3$: SCORE VALUE OF FIRST HIERARCHICAL DISCRIMINATING DEVICE #3 | $x_4$: SCORE VALUE OF FIRST HIERARCHICAL DISCRIMINATING DEVICE #4 |

SECOND HIERARCHICAL FEATURE VECTOR

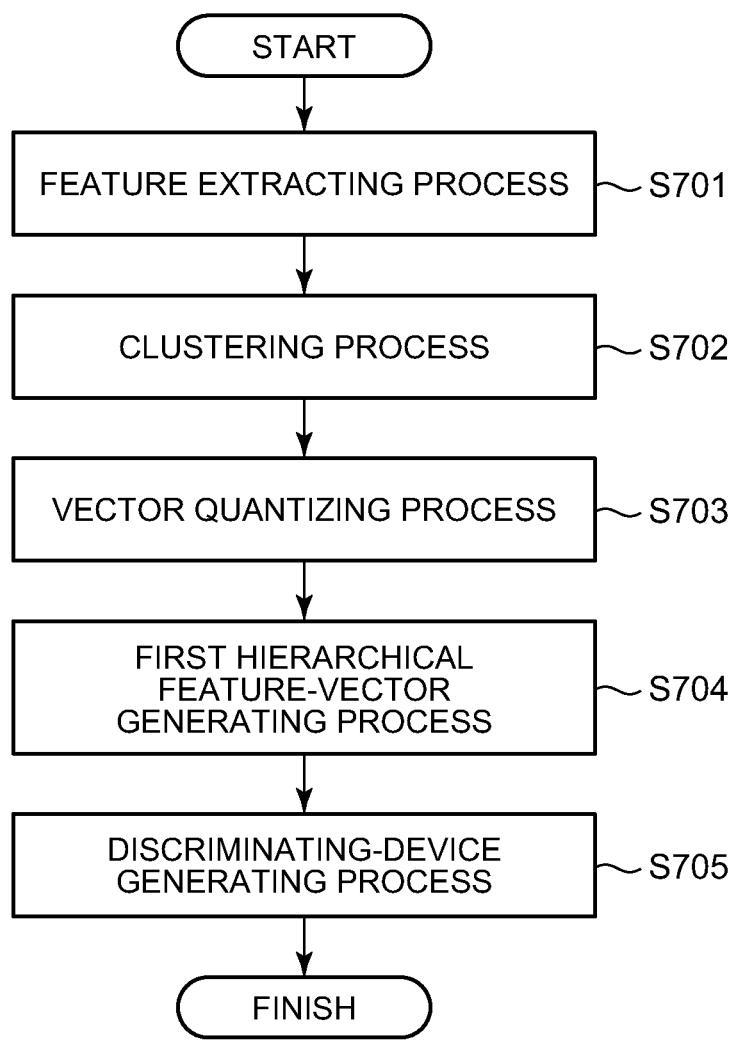

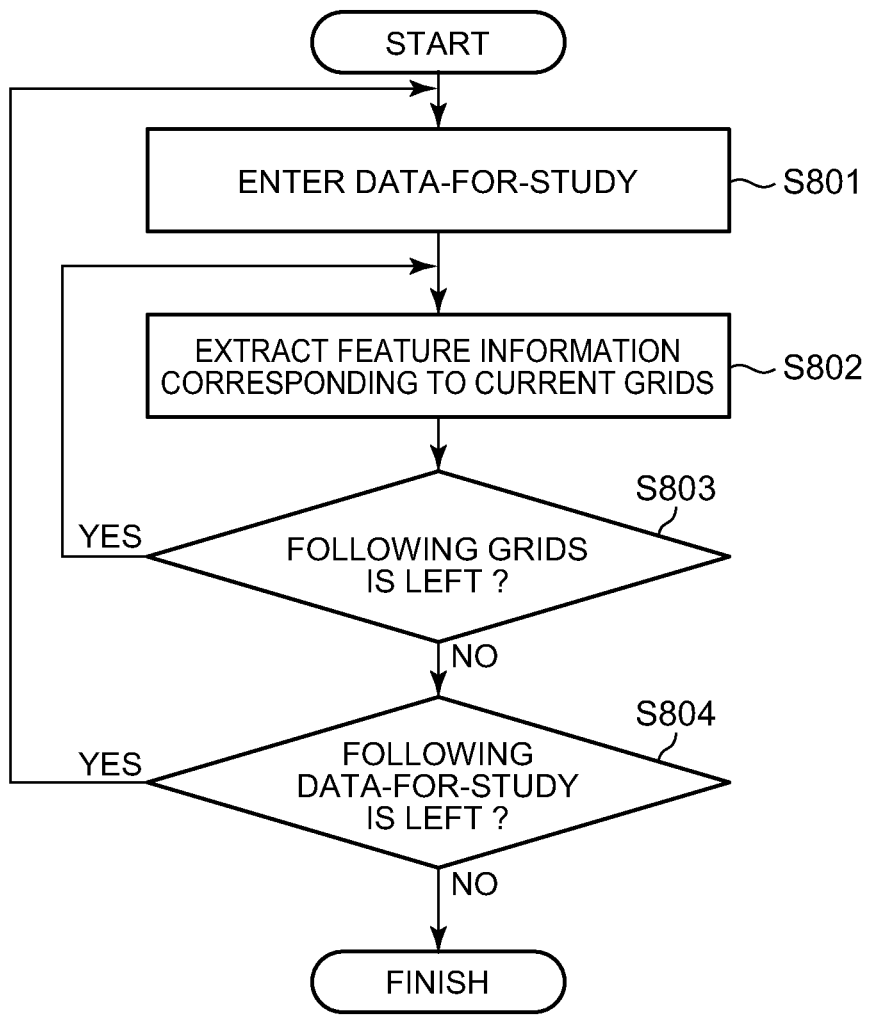

MULTI-CLASS DISCRIMINATING DEVICE

CROSS-REFERENCE TO RELATED APPLICATION

The present application is based upon and claims the benefit of priority from the prior Japanese Patent Application No. 2012-236440, filed Oct. 26, 2012, the entire contents of which are incorporated herein by reference.

BACKGROUND OF THE INVENTION

1. Field of the Invention

The present invention relates to a multi-class discriminating device.

2. Description of the Related Art

When happen to see a flower in the fields or on roadsides, we often come to want to know the name of the flower. A technique of using a statistic method to discriminate the sort of the flower has been proposed, for example, in Japanese Unexamined Patent Publication No. 2002-203242. A digital image of the flower and/or the leaves of the flower is obtained by shooting. The technique uses a clustering method to extract a number of features of local parts of the flower and/or the leaf, and a histogram of the extracted features is created to obtain single or plural feature amounts. Further, the technique refers to a previously prepared database, in which feature amounts of the various sorts of flowers are registered, to analyze the obtained feature amounts of the flower, thereby discriminating the sort of the flower.

When an image classification is performed on image data such as data of flowers, a so-called two-class discriminating device, which classifies images into two classes, one sort of images and the other sort of images, can be easily realized in the field of machine learning. Meanwhile, when a multi-class image classification is performed to discriminate some sorts of images from plural sorts of images, it is general to use a so-called multi-class discriminating device consisting of a combination of two-class discriminating devices. For instance, when images of flowers are classified into six sorts of images, six two-class discriminating devices are generated. Each of the six discriminating devices is generated, such that said discriminating device outputs the maximum score value when an image of the sort designated thereto is entered. When images are entered to the discriminating devices, respectively, the sort of flowers will be obtained as the discrimination result, which sort has been assigned to the discriminating device which outputs the most maximum score value, among the six discriminating devices.

SUMMARY OF THE INVENTION

According to one aspect of the invention, there is provided a multi-class discriminating device, for judging which class out of plural classes a feature represented by data falls into, which device comprises a first hierarchical discriminating-device generating unit for generating plural first hierarchical discriminating devices each for discriminating one from N, and a second hierarchical discriminating-device generating unit for combining score values output respectively from the plural first hierarchical discriminating devices to generate a second hierarchical feature vector, and for entering the second hierarchical feature vector to generate plural second hierarchical discriminating devices each for discriminating one from N, wherein when data is entered, the plural first hierarchical discriminating devices output score values respectively, and these score values are combined to generate the second hierarchical feature vector, and when the second hierarchical feature vector is entered, the second hierarchical discriminating device which outputs the maximum score value is selected from among the plural second hierarchical discriminating devices, and the class corresponding to the selected second hierarchical discriminating device is discriminated as the class, into which the feature represented by the entered data falls.

BRIEF DESCRIPTION OF THE DRAWINGS

FIG. 3 is a view showing a configuration of a two hierarchy multi-class discriminating device generated in the multi-class discriminating-device generating process shown in FIG. 2.

FIG. 4 is a pattern diagram indicating an example of a space, in which first hierarchical feature vectors are distributed.

FIG. 5 is a view showing an example of a table containing score values output from first hierarchical discriminating devices.

FIG. 6 is a view showing an example of a data configuration of a second hierarchical feature vector.

FIG. 7 is a flow chart showing a first hierarchical discriminating-device generating process (FIG. 2) in detail.

FIG. 8 is a flow chart showing a feature extracting process (FIG. 7) in detail.

DETAILED DESCRIPTION OF THE PREFERRED EMBODIMENTS

Now, the preferred embodiments of the invention will be described with reference to the accompanying drawings in detail.

Figure 1:
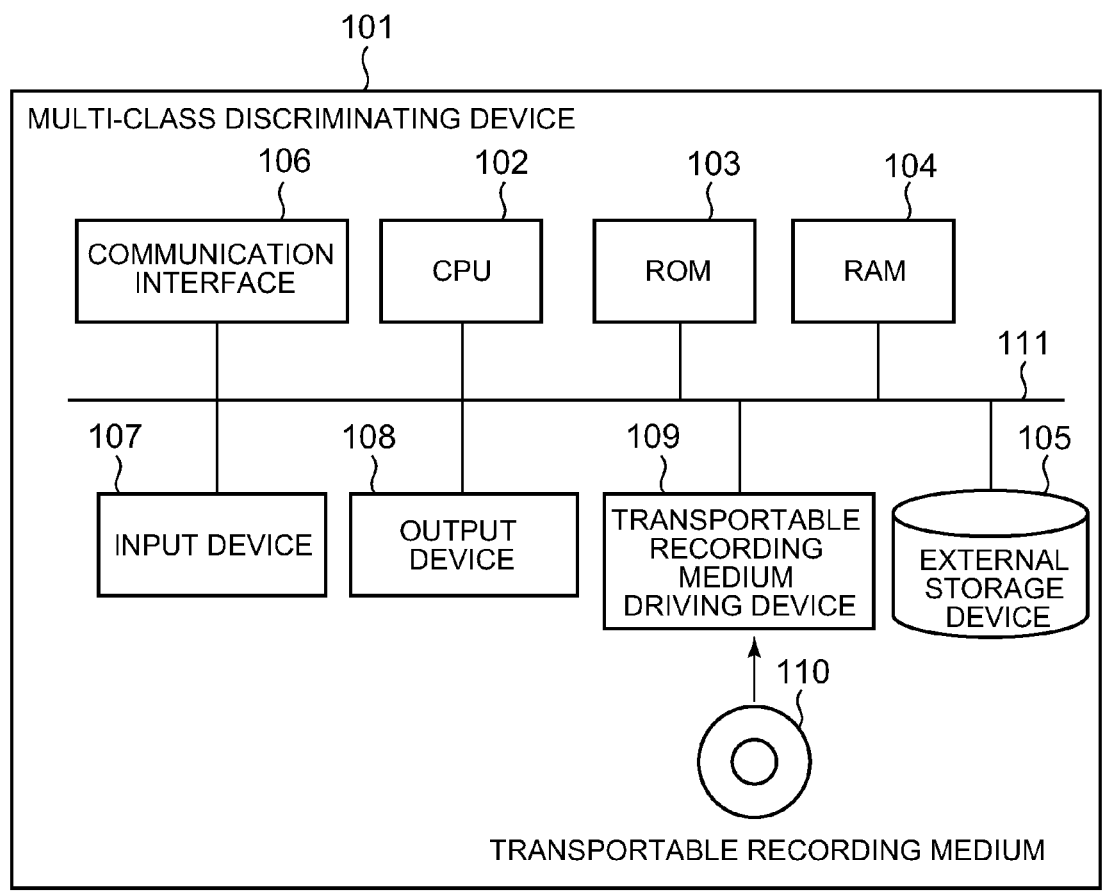
FIG. 1 is a block diagram of a hardware configuration of a multi-class discriminating device according to one embodiment of the invention.

FIG. 1 is a block diagram of a hardware configuration of a multi-class discriminating device 101 according to one embodiment of the invention.

The multi-class discriminating device 101 receives pickup-image data such as images of flowers from a handheld terminal such as a smart phone, discriminates the sort of the flower of the pickup-image data using its own discriminator, and feeds back the result of the discrimination to the handheld terminal. This multi-class discriminating device 101 will be realized on a computer of a searching system.

As shown in FIG. 1, the multi-class discriminating device 101 is provided with CPU (Central Processing Unit) 102, ROM (Read Only Memory) 103, and RAM (Random Access Memory) 104. Further, the multi-class discriminating device 101 is provided with an external storage device 105 such as a hard disk storage device and a solid state drive storage device, a communication interface 106, an input device 107 such as a keyboard device and a mouse, and an output device 108 such as a displaying device. The multi-class discriminating device 101 is further provided with a transportable recording medium driving device 109 for receiving and driving a transportable recording medium 110 such as SD memory cards, USB (Universal Serial Bus) memory cards, CD (Compact Disk), and DVD (Digital Versatile Disk). The above devices 102 to 109 are connected to each other through a bus 111.

A controlling program is stored in ROM 103. CPU 102 runs the controlling program to control a multi-class discriminating device generating process, which will be performed in accordance with flow charts shown in FIG. 2 and FIG. 7 to FIG. 12. CPU 102 reads the controlling program from ROM 103 and runs said controlling program using RAM 104 as a working memory. The multi-class discriminating device 101 operating based on the hardware configuration is software and stored in ROM 103 and RAM 104, or in the external storage device 105. Data-for-study to be input in the multi-class discriminating device generating process is supplied, for example, from the external storage device 105 or from the transportable recording medium 110 installed onto the transportable recording medium driving device 109.

After the multi-class discriminating device has been generated, CPU 102 reads software of the multi-class discriminating device 101 from ROM 103, RAM 104 or from the external storage device 105 and runs the same software, thereby working as the multi-class discriminating device 101. In other way, it is possible to use other computer system operating as the multi-class discriminating device. The multi-class discriminating device 101 receives pickup-image data of flowers from the handheld terminals such as a so-called smart phone through the communication interface 106 via the Internet. Then, the multi-class discriminating device 101 discriminates the sort of the flowers and sends back the result of the discrimination to the handheld terminal through the communication interface 106 via the Internet. The multi-class discriminating device 101 can be directly installed on the smart phones as application software for the smart phones.

Figure 2:
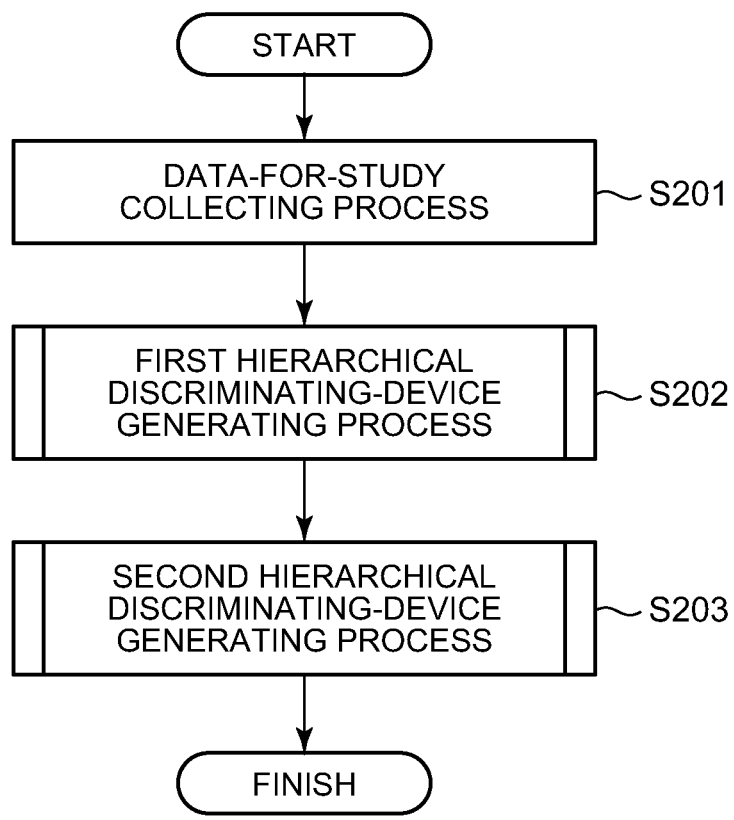
FIG. 2 is a flow chart of a multi-class discriminating-device generating process performed in the multi-class discriminating device according to the embodiment of the invention.

FIG. 2 is a flow chart of the multi-class discriminating device generating process performed by the multi-class discriminating device 101 having the hardware configuration shown in FIG. 1.

The process to be processed in accordance with the flow chart of FIG. 2 is controlled by CPU 102, when CPU 102 runs the controlling program stored in ROM 103 shown in FIG. 1. Further, said process is performed together with the processes whose details are shown in the flow charts of FIG. 7 to FIG. 12.

A data-for-study collecting process is performed (step S201 in FIG. 2). More specifically, data-for-study is prepared in the external storage device 105 shown in FIG. 1. The data-for-study is prepared for all of the classes to be discriminated. For example, when the data of flowers is to be discriminated, the data-for-study is prepared for all the sorts of flowers to be discriminated. Each piece of data-for-study is given a label indicating a class (for instance, a sort of flower images) of the feature represented by said data-for-study. Assuming that the number of classes is denoted by (N) and the number of pieces of data-for-study is by (n), as a whole, (N) by (n) pieces of data-for-study will be prepared. More particularly, with respect to each of four sorts of the images of flowers such as morning glories, bindweeds, Asiatic day flowers, and sunflowers, 50 pieces of image data are collected as data-for-study. And further, a label database relating to the flower name is created with respect to each piece of the collected image data.

Then, a first hierarchical discriminating-device generating process is performed to realize a function of the first hierarchical discriminating-device generating unit (step S202 in FIG. 2). In the first hierarchical discriminating-device generating process at step S202, a first hierarchical feature vector extracted from plural pieces of data-for-study is entered and it is judged whether the features represented by the respective pieces of data-for-study fall into one of the plural classes. The first hierarchical discriminating-device generating process is performed with respect to all of the classes. As a result, plural first hierarchical discriminating devices have been generated, which judges whether the features represented by the respective pieces of data-for-study fall into to plural classes, respectively.

Then, a second hierarchical discriminating-device generating process is performed to realize a function of the second hierarchical discriminating-device generating unit (step S203). In the second hierarchical discriminating-device generating process at step S203, with respect every piece of data-for-study, the data-for-study is entered to the first hierarchical discriminating devices 302 of respective classes generated at step 202. As a result, score values output from the first hierarchical discriminating devices 302 of the respective classes are connected or put together, whereby a second hierarchical feature vector corresponding to the entered data-for-study is generated. The second hierarchical feature vector is generated every time the data-for-study is entered. Then, the second hierarchical feature vectors are entered and a process for generating a second hierarchical discriminating device is performed with respect to all the plural classes, wherein the second hierarchical discriminating device judges whether the features represented by plural pieces of data-for-study corresponding to the entered second hierarchical feature vectors fall into one of the plural classes. As a result, plural second hierarchical discriminating devices 304 have been generated, which judges whether the features represented by the respective pieces of data-for-study fall into plural classes, respectively.

FIG. 3 is a view showing a configuration of a two-hierarchy multi-class discriminating device generated in the multi-class discriminating device generating process shown in FIG. 2.

In the first hierarchical discriminating-device generating process at step S202 (FIG. 2), the following first hierarchical discriminating devices 302 are generated: a first hierarchical discriminating device 302 (#1) for discriminating bindweeds from others; a first hierarchical discriminating device 302 (#2) for discriminating morning glories from others; a first hierarchical discriminating device 302 (#3) for discriminating Asiatic day flowers from others; and a first hierarchical discriminating device 302 (#4) for discriminating sunflowers from others. More specifically, the first hierarchical feature vector is entered, which is extracted, based on picturesque feature information (color, texture, etc.), from plural pieces of data-for-study attached with the label of the class corresponding to any one of sorts of the bindweeds, morning glories, Asiatic day flowers, or sunflowers, whereby these first hierarchical discriminating devices 302 are generated.

The score values output from the first hierarchical discriminating devices 302 (#1 to #4) vary depending on how much the data-for-study for generating the first hierarchical discriminating devices 302 of each class is separate from the data-for-study of other class (degree of separation). Therefore, the first hierarchical discriminating devices 302 (#1 to #4) are not even and normalized in their discriminating capabilities.

The above problem will be described with reference to a pattern diagram shown in FIG. 4. The pattern diagram indicates an example of a feature space, in which the first hierarchical feature vectors are distributed. The pattern diagram shown in FIG. 4 is an explanation view prepared, for simplicity, on the assumption that the first hierarchical feature vectors 301 are two-dimensional vectors each consisting of two element values (x1, x2). The distribution of the sunflowers is omitted from the pattern diagram.

In the example of the distributions of the first hierarchical feature vectors 301 in the feature space shown in FIG. 4, a distance in the feature space between the distribution 401 of the moaning glories and the distribution 402 of the bindweeds is short, and these flowers are very similar in their picturesque features. Accordingly, it is expected that both the first hierarchical discriminating device 302 (#1) generated based on the first hierarchical feature vector 301, for discriminating the bindweeds from others and the first hierarchical discriminating device 302 (#2) generated based on the first hierarchical feature vector 301, for discriminating the morning glories from others output the score values close to each other.

FIG. 5 is a view of an example of a table containing score values output from the first hierarchical discriminating devices 302 (#1 to #4) shown in FIG. 3. In the example of the table shown in FIG. 5, score values are indicated, which are output from the first hierarchical discriminating devices 302 (#1 to #4) respectively, when the data-for-study of moaning glories is entered thereto, and also score values are indicated, which are output from the first hierarchical discriminating devices 302 (#1 to #4) respectively, when the data-for-study of bindweeds is entered thereto. In the example, the score value, which is output from the first hierarchical discriminating device 302 (#1) for discriminating the bindweeds from others, when the data-for-study of moaning glories is entered thereto and the score value, which is output from the first hierarchical discriminating device 302 (#2) for discriminating the morning glories from others, when the data-for-study of moaning glories is entered thereto are "0.8±0.5" and "0.9±0.5", respectively. These score values are very close to each other. Further, the score value, which is output from the first hierarchical discriminating device 302 (#1), when the data-for-study of bindweeds is entered thereto and the score value, which is output from the first hierarchical discriminating device 302 (#2), when the data-for-study of morning glories is entered thereto are "0.9±0.5" and "0.8±0.5", respectively. These score values are also very close to each other.

Therefore, when image data of bindweeds and image data of morning glories are entered to the first hierarchical discriminating device 302, it will be expected that the first hierarchical discriminating device 302 can easily make an error in discrimination.

Meanwhile, in the example of the distributions of the first hierarchical feature vectors 301 in the feature space shown in FIG. 4, a distance in the featuring space between the distribution 402 of the bindweeds and the distribution 403 of the Asiatic day flowers is large and these flowers are not similar in picturesque feature. Therefore, it will be expected that the first hierarchical discriminating device 302 (#1) for discriminating the bindweeds from others and the first hierarchical discriminating device 302 (#3) for discriminating the Asiatic day flowers from others, both generated based on the first hierarchical feature vector 301, output the score values, respectively, which values are not close to each other.

As indicated in the table of FIG. 5, the score value, which is output from the first hierarchical discriminating device 302 (#1) when the data-for-study of bindweeds is entered thereto and the score value, which is output from the first hierarchical discriminating device 302 (#3), when the data-for-study of bindweeds is entered thereto are "0.9±0.5" and "−0.5±0.5", respectively, which values are not close to each other.

When input data of bindweeds is entered, or when input data of Asiatic day flowers is entered, it will be hardly likely that the first hierarchical discriminating device 302 (#1) for discriminating the bindweeds from others and the first hierarchical discriminating device 302 (#3) for discriminating the Asiatic day flowers from others will make an error in discrimination.

In the example of the distributions of the first hierarchical feature vectors 301 in the feature space shown in FIG. 4, a distance in the feature space between the distribution 401 of the morning glories and the distribution 403 of the Asiatic day flowers is in the medium length and these flowers can not be definitely decided to be similar or not to be similar in picturesque feature. As indicated in the table of FIG. 5, the score value, which is output from the first hierarchical discriminating device 302 (#2) for discriminating the morning glories from others, when the data-for-study of morning glories is entered thereto and the score value, which is output from the first hierarchical discriminating device 302 (#3) for discriminating the Asiatic day flowers from others, when the data-for-study of morning glories is entered thereto are "0.9±0.5" and "0.5±0.5", respectively, which values are approximately close to each other.

As described above, if the first hierarchical discriminating devices 302 (#1 to #4) are not even in discriminating capability, the first hierarchical discriminating devices 302 (#1 to #4) will easily make an error in discrimination depending on the sort of the flower to be entered as the data-for-study, resulting in lowering reliability of discrimination.

Further, since the number of pieces of data-for-study used to generate the respective first hierarchical discriminating devices 302 (#1 to #4) is not always even and the enough number of pieces of data-for-study is not used, the first hierarchical discriminating devices 302 (#1 to #4) are not even and normalized in discriminating capability, resulting in lowering reliability of discrimination.

Further, in the present embodiment of the invention, the first hierarchical discriminating devices 302 (#1 to #4) receive the data-for-study to output the score values, respectively, and then, these score values are connected or put together, whereby a second hierarchical feature vector 303 corresponding to the entered data-for-study is generated (step S203 in FIG. 2). FIG. 6 is a view showing an example of a data configuration of the second hierarchical feature vector 303. In the data configuration shown in FIG. 6, the score values output from the first hierarchical discriminating devices 302 (#1 to #4) are denoted by $X_1$, $X_2$, $X_3$ and $X_4$, respectively. In the present embodiment of the invention, the second hierarchical feature vector 303, that is, a four-dimensional feature vector $(X_1, X_2, X_3, X_4)$ having these score values as four element values is generated.

Further, in the present embodiment of the invention, following second hierarchical discriminating devices 304, which receive the second hierarchical feature vector 303 having the above data configuration, are generated: a second hierarchical discriminating device 304 (#1) for discriminating the bindweeds from others; a second hierarchical discriminating device 304 (#2) for discriminating the morning glories from others; a second hierarchical discriminating device 304 (#3) for discriminating the Asiatic day flowers from others; and a second hierarchical discriminating device 304 (#4) for discriminating the sunflowers from others.

For instance, when the second hierarchical discriminating device 304 (#1) is generated, all the score values output respectively from the first hierarchical discriminating devices 302 (#1 to #4) will be evaluated. In the second hierarchical feature vector 303, to which the score values output from the first hierarchical discriminating devices 302 (#1 to #4) are entered, when the score value $X_1$ output from the first hierarchical discriminating device 302 (#1) for discriminating the bindweeds from others is large, and the value $X_3$ output from the first hierarchical discriminating device 302 (#3) for discriminating the Asiatic day flowers from others is small, the second hierarchical discriminating device 304 (#1) for discriminating the bindweeds from others, which outputs the maximum score value can be generated in a maximum score judgment 305. Further, when the score value $X_2$ output from the first hierarchical discriminating device 302 (#2) for discriminating morning glories from others is large and the score value $X_3$ output from the first hierarchical discriminating device 302 (#3) for discriminating the Asiatic day flowers from others is also a little large, in the second hierarchical feature vector 303, the second hierarchical discriminating device 304 (#2) for discriminating morning glories from others, which outputs the maximum score value can be generated in the maximum score judgment 305.

In the second hierarchical discriminating device 304, for example, when the second hierarchical feature vector 303 corresponding to the data-for-study of morning glories is entered, the score value output from the second hierarchical discriminating device 304 (#1) for discriminating the bindweeds from others will not be large, because the score value $X_3$ in the second hierarchical feature vector 303 is relatively large. Further, for instance, when the second hierarchical feature vector 303 corresponding to the data-for-study of bindweeds is entered, the score value output from the second hierarchical discriminating device 304 (#2) for discriminating the morning glories from others will not be large, because the score value $X_3$ in the second hierarchical feature vector 303 is relatively small.

As described above, in the present embodiment of the invention, it is possible to make the discriminating capabilities of the classes (#1 to #4) even and normalized in the multi-class discriminating device, that is, in the two-hierarchy multi-class discriminating device consisting of the first hierarchical discriminating devices 302 (#1 to #4) and the second hierarchical discriminating devices 304 (#1 to #4) as shown in FIG. 3.

FIG. 7 is a flow chart showing the first hierarchical discriminating-device generating process of FIG. 2 in detail. This flow chart represents a process to be performed to generate the first hierarchical discriminating devices, which receive data including 4 classes of flower images such as morning glories, Asiatic day flowers, bindweeds, and sunflowers to discriminate the features of these flower images. To extract the features of the images, a general method used in classifying images, that is, a so-called BOF (Bag Of Feature) is employed to extract the features from the respective images.

At first, a feature extracting process is performed (step S701 in FIG. 7). In the process, feature information corresponding to each of grids of the image represented by each piece of data-for-study is extracted, and the extracted feature information is stored in RAM 104 shown in FIG. 1. In the process, information of color and information of texture corresponding to each of the grids of the image are extracted as the feature information. Then, a clustering process is performed (step S702 in FIG. 7). In the clustering process, all the plural pieces of feature information of color corresponding respectively to all the grids of the images, for instance, 50 images of 4 sorts of flowers, represented by all the data-for-study are clustered into plural clusters (for example, 500 clusters). As a clustering algorithm, for example, a method of "k-means" is used. The feature information of texture is also clustered into plural clusters (for example, 500 clusters) in the similar manner to the feature information of color.

Then, a vector quantizing process is performed (step S703 in FIG. 7). In the vector quantizing process, the following process is performed with respect to each of the plural pieces of data-for-study. More specifically, notice is given to the plural pieces of feature information corresponding respectively to the grids of the image represented by the data-for-study, which are extracted and stored in RAM 104 of FIG. 1 at step S701, and distances are calculated, between the above plural pieces of feature information and RGB data at the centroid of each of the plural clusters calculated at step S702. The cluster corresponding to the shortest distance among the calculated distances is selected as the closest cluster, and the centroid data of the closest cluster is used as the vector quantized value of the feature information. This vector quantizing process is performed with respect to the feature information of color and the feature information of texture, and the closest cluster of color and the closest cluster of texture obtained at step S702 are used to select the vector quantized values. The vector quantized values of color and texture extracted from plural pieces of feature information of color and feature information of texture, corresponding respectively to the grids of the data-for-study are stored in RAM 104 shown in FIG. 1.

A first hierarchical feature-vector generating process (histogram generating process) is performed (step S704 in FIG. 7). In the first hierarchical feature-vector generating process, notice is given to the vector quantized values corresponding respectively to the grids of the image represented by the data-for-study, which are obtained and stored in RAM 104 at step S703, and a process is repeatedly performed, of accumulating a histogram frequency of each of the closest clusters corresponding to the vector quantized values. The process of accumulating a histogram frequency is repeatedly performed with respect to each of the plural pieces of data-for-study. As the result of performing the above process, a histogram corresponding to the data-for-study is generated. Further, the first hierarchical feature vector (301 in FIG. 3) is generated, which has the histogram frequencies (vertical heights) of respective bins in the generated histogram as its element values, and stored in RAM 104 of FIG. 1 together with a label indicating the class attached to said data-for-study. In generating the histograms, the vector quantized values are used, which are extracted at step S703 with respect to the feature information of color independently from the feature information of texture, and vice versa, and the histogram of color and the histogram of texture are generated. The first hierarchical feature vector is generated, which has the histogram frequencies (vertical heights) of respective bins in the histogram of color and the histogram frequencies (vertical heights) of the respective bins in the histogram of texture in combination as its element values.

Finally, a discriminating-device generating process is performed (step S705 in FIG. 7). The following process is performed with respect to the plural classes. At first, a first group of the first hierarchical feature vectors attached with a label indicating one class is read from among the first hierarchical feature vectors, which were stored in RAM 104 in the process at step S704. Then, a second group of the first hierarchical feature vectors attached with a label indicating a class other than said one class is read from RAM 104. Based on the two groups of the first hierarchical feature vectors, the first hierarchical discriminating device corresponding to said one class is generated, which device outputs the maximum score value, when data belonging to said one class is entered. This process is performed with respect to plural classes, and as a result, plural first hierarchical discriminating devices 302 (#1 to #4) are generated, for judging whether the features represented respectively by plural pieces of data-for-study belong to the plural classes, respectively.

In the above process of generating discriminating device, the processes at step S701 to step S704 are performed once with respect to each piece of data-for-study, and the result is stored in RAM 104 of FIG. 1. In the discriminating device generating process at step S705, the results of the processes performed respectively at step S701 to step S704 are repeatedly read from RAM 104 and can be rapidly processed.

FIG. 8 is a flow chart showing the feature extracting process (step S701 in FIG. 7) in detail.

In the feature extracting process, the data-for-study is entered from RAM 104 of FIG. 1 one piece by one piece at step S801, and a series of processes are performed on the data-for-study at step S802 and step S803 until it is determined at step S804 that there is left on data-for-study to be processed.

When one piece of data-for-study is entered at step S801, feature information of color and feature information of texture, corresponding to the initial grids of the image represented by said data-for-study are extracted and stored in RAM 104 (step S802 in FIG. 8).

A process (step S802) is performed to extract the feature information from the data-for-study with respect to each of the grids (processes S802→S803→S802 are repeatedly performed) until it is determined at step S803 that there is left on grid to be processed.

When the process for extracting the feature information of all the grids of the data-for-study has finished, CPU 102 judges at step S804 whether there is left the following data-for-study to be processed (step S804 in FIG. 8).

When it is determined that there is left data-for-study to be processed (YES at step S804), CPU 102 returns to step S801 and performs the processes at step S801 to step S804 again.

When it is determined NO at S804, CPU 102 finishes the feature extracting process (step S801 to step S804) at step S701 in FIG. 7.

Figure 9:
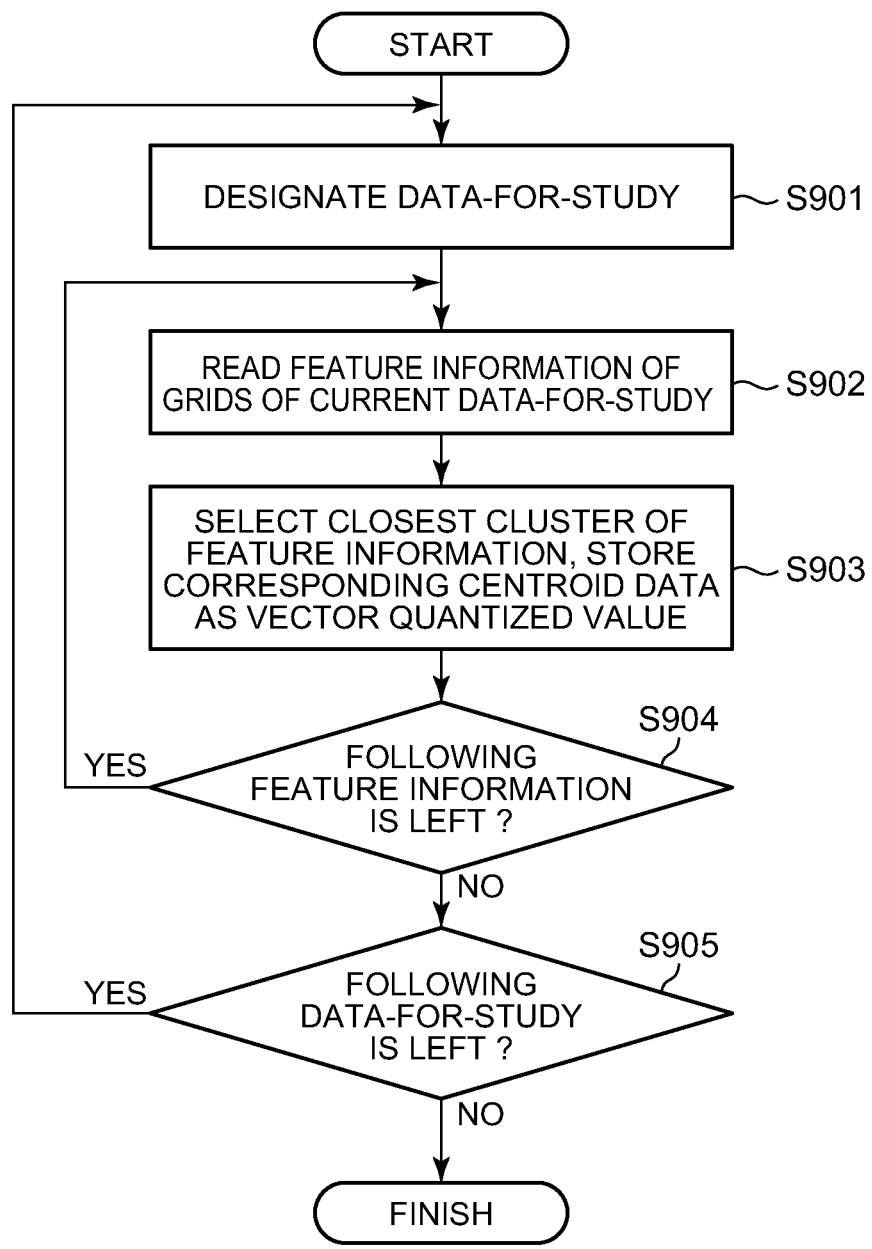
FIG. 9 is a flow chart showing a vector quantizing process (FIG. 7) in detail.

FIG. 9 is a flow chart showing the vector quantizing process (step S703 in FIG. 7) in detail.

In the vector quantizing process, the data-for-study stored in RAM 104 of FIG. 1 is designated one piece by one piece at step S901, and a series of processes are performed at step S902 to step S904 until it is determined at step S905 that there is left no following data-for-study to be processed.

When one piece of data-for-study stored in RAM 104 is designated at step S901, the processes are repeatedly performed at step S902 and S903 until it is determined at step S904 that no feature information is extracted from said designated data-for-study.

At first, feature information of color and feature information of texture, corresponding respectively to all the grids of the current data-for-study are read from RAM 104 (step S902 in FIG. 9).

Then, distances are calculated, respectively between the plural pieces of feature information of color read from RAM 104 at step S902 and RGB data at the centroids of the clusters of colors calculated at step S702 in FIG. 7. The cluster of color corresponding to the shortest distance among the calculated distances is selected as the closest cluster, and the centroid data of the selected closest cluster is used as a vector quantized value of the feature information of color. In a similar fashion, distances are calculated, respectively between the plural pieces of feature information of texture read from RAM 104 at step S902 and RGB data at the centroids of the clusters of texture calculated at step S702 in FIG. 7. The cluster of texture corresponding to the shortest distance among the calculated distances is selected as the closest cluster, and the centroid data of the selected closest cluster is used as a vector quantized value of the feature information of texture. In this way, the vector quantized values extracted respectively from the feature information of color and the feature information of texture are stored in RAM 104 (step S903 in FIG. 9).

Then, CPU 102 judges at step S904 whether the following feature information corresponding to the grid of the current data-for-study is still left in RAM 104.

When it is determined YES at step S904, CPU 102 returns to step S902, and performs the processes on the following feature information at step S902 and step S903, again.

When it is determined that the vector quantizing process has been finished over all the feature information (NO at step S904), CPU 102 judges whether there is left the following data-for-study to be processed (step S905 in FIG. 9).

When it is determined YES at step S905, CPU 102 returns to step S901 and performs the processes at step S901 to step S904 again.

When it is determined that the vector quantizing process has been finished over all the data-for-study (NO at step S905), CPU 102 finishes the vector quantizing process of FIG. 9 (step S703 in FIG. 7).

Figure 10:
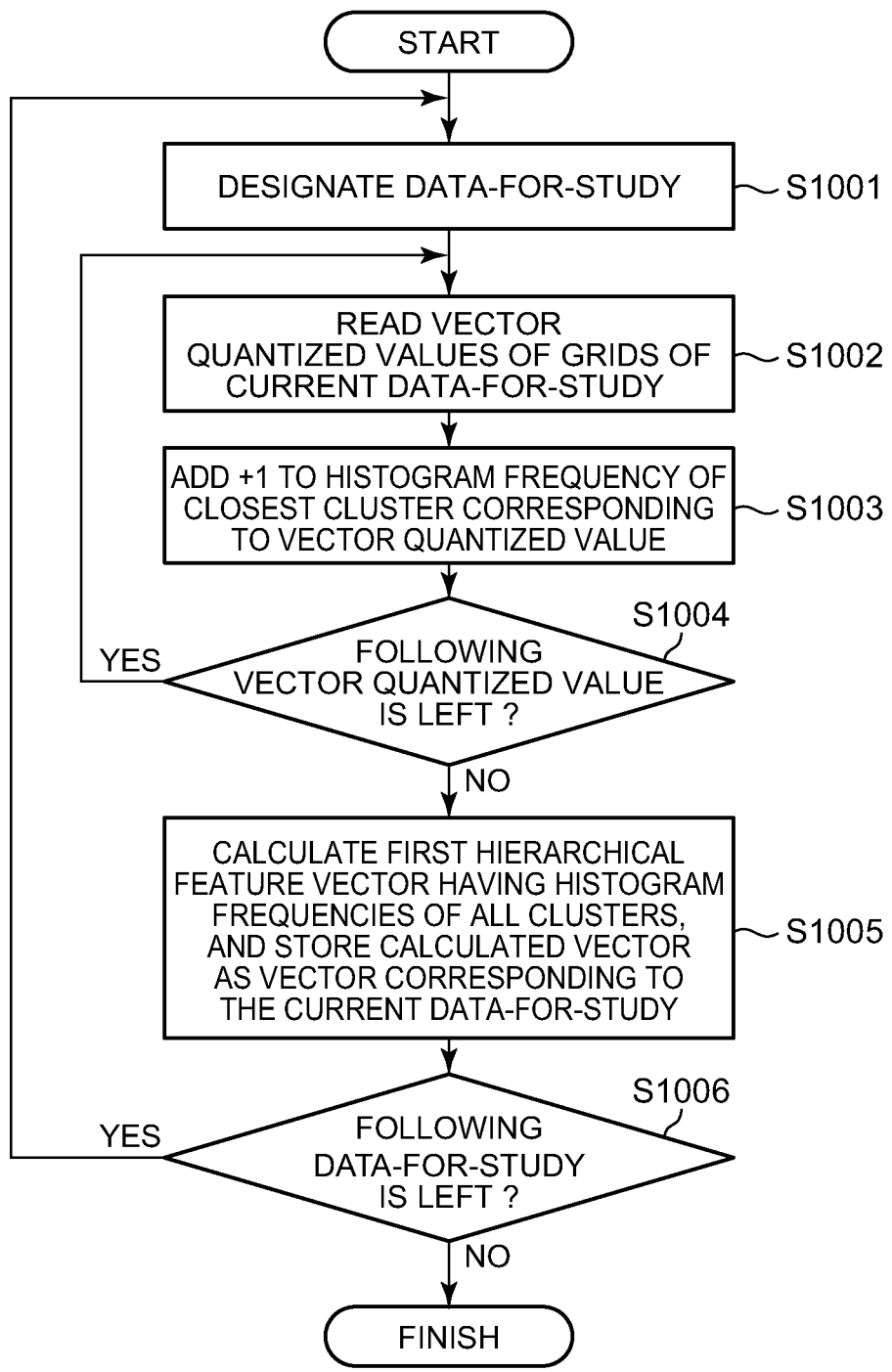
FIG. 10 is a flow chart showing a first hierarchical feature-vector generating process (FIG. 7) in detail.

FIG. 10 is a flow chart showing the first hierarchical feature-vector generating process (histogram generating process, step S704 in FIG. 7) in detail.

In the first hierarchical feature-vector generating process, the data-for-study stored in RAM 104 of FIG. 1 is designated one piece by one piece at step S1001, and a series of processes are performed at step S1002 to step S1005 until it is determined at step S1006 that there is left no following data-for-study to be processed.

When one piece of data-for-study stored in RAM 104 is designated at step S1001, the processes are repeatedly performed at step S1002 and S1003 until it is determined at step S1004 that no vector quantized value is obtained from said designated data-for-study.

At first, the vector quantized values corresponding respectively to the grids of the current data-for-study, more particularly, vector quantized values of color and vector quantized values of texture, both corresponding respectively to the grids of the current data-for-study are read from RAM 104 at step S1002 in FIG. 10.

Then, a value of "1" is added to the histogram frequency of the closest cluster corresponding to the vector quantized value read from RAM 104, wherein said histogram frequency of the closest cluster is also stored in RAM 104. More specifically, a value of 1 is added to the histogram frequency (of color) of the closest cluster (of color) corresponding to the vector quantized value of color stored in RAM 104. In a similar manner, a value of 1 is also added to the histogram frequency (of texture) of the closest cluster (of texture) corresponding to the vector quantized value of texture stored in RAM 104 (step S1003 in FIG. 10).

Further, CPU 102 judges whether there is left in RAM 104 any vector quantized value corresponding to the grid of the current data-for-study (step S1004 in FIG. 10).

When it is determined YES at step S1004, CPU 102 returns to step S1002 and performs the processes at step S1002 and step 1003 again.

When an operation of counting of the histograms concerning all the vector quantized values finishes and it is determined NO at step S1004, the following process will be performed. More particularly, the first hierarchical feature vector having the histogram frequencies of all the clusters stored in RAM 104 as the element values is calculated. In other words, the first hierarchical feature vector is generated, which has the histogram frequencies of all the bins of the histograms of colors (all the clusters of colors) and the histogram frequencies of all the bins of the histograms of textures (all the clusters of textures) in combination its element values. The first hierarchical feature vector corresponding to the current data-for-study, generated in the above manner, is stored in RAM 104 (step S1005 in FIG. 10).

Thereafter, CPU 102 judges whether there is left any following data-for-study to be processed (step S1006 in FIG. 10).

When it is determined YES at step S1006, CPU 102 returns to step S1001 and performs the processes at step S1001 to step 1005, again.

When it is determined that the histogram generating process has finished over all the data-for-study (NO at step S1006), the first hierarchical feature-vector generating process of FIG. 10 (histogram generating process) finishes (step S704 in FIG. 7).

Figure 11:
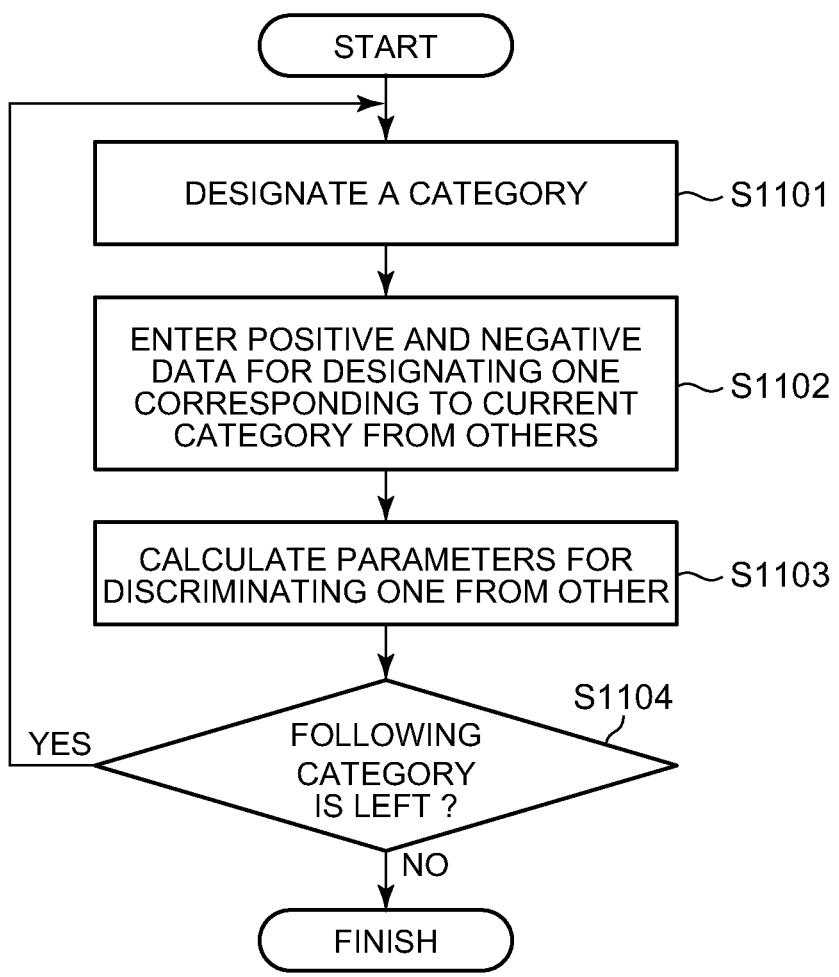
FIG. 11 is a flow chart showing a discriminating-device generating process (FIG. 7 or FIG. 12) in detail.

FIG. 11 is a flow chart showing the discriminating-device generating process (step S705 in FIG. 7) in detail.

At first, a category indicating one class to be discriminated from among plural classes is designated (step S1101 in FIG. 11).

Then, positive and negative data corresponding to the current category are entered for discriminating one from others. For instance, in the case where the category is a sort of flowers, the data-for-study attached with the label indicating one class corresponding to the sort of the flowers, designated at step S1101 is defined as the positive data. The data-for-study attached with the label indicating a class other than said one class is defined as the negative data. The first hierarchical feature vectors corresponding to the data-for-study to be used as the positive data are read from RAM 104 and used as a first group of vectors. The first hierarchical feature vectors corresponding to the data-for-study to be used as the negative data are read from RAM 104 and used as a second group of vectors (step S1102 in FIG. 11).

Based on the first and second groups of the second hierarchical feature vectors obtained at step S1102, parameters for discriminating one from others in the second hierarchical discriminating device of one class are calculated, such that the hierarchical discriminating device of said one class outputs the maximum score value, when data is entered, belonging to said one class corresponding to a category designated at step S1101 to be discriminated (step S1103 in FIG. 11).

More specifically, it is presumed that the first hierarchical feature vector given by the following mathematical expression (1) is entered in such first hierarchical discriminating device. In the mathematical expression (1), N denotes the number of elements of the first hierarchical feature vector, and, for example, N represents the sum of the number of bins in the color histogram and the number of bins in the texture histogram. $x_i$ ($1 \le i \le N$) denotes a histogram frequency of the i-th bin, when the bin numbers of the bins in the color histogram and the bin numbers of the bins in the texture histogram are disposed in order.

$$\text{First hierarchical feature vector} = (x_1, x_2, x_3, \ldots, x_N) \quad (1)$$

As shown in the following mathematical expression (2), the elements, $x_1, x_2, x_3, \ldots, x_N$ of the feature vector of the mathematical expression (1) are multiplied by weights $c_1, c_2, c_3, \ldots, c_N$, respectively, and the total sum of the respective products is obtained as the score value f(x) of the first hierarchical discriminating device.

$$f(x) = c_1 x_1 + c_2 x_2 + c_3 x_3 + \ldots + c_N x_N \quad (2)$$

In the calculation of the parameters at step S1103, the above weights $c_1, c_2, c_3, \ldots, c_N$ are calculated such that when the first group of the first hierarchical feature vector is entered to the first hierarchical discriminating device, said first hierarchical discriminating device 302 outputs the maximum scour value and when the second group of the first hierarchical feature vector is entered to the first hierarchical discriminating device 302, said first hierarchical discriminating device 302 outputs a scour value, which is as small as possible.

To calculate the weights $c_1, c_2, c_3, \ldots, c_N$, a publicly well known technique can be employed, such as the so-called "linear discriminant analysis" used by linear classifiers in the field of machine learning.

Using the decided weights $c_1, c_2, c_3, \ldots, c_N$, the first hierarchical discriminating device operates the above mathematical expression (2) to output the score value f(x).

Further, CPU 102 judges whether a category corresponding to the following class has been designated (step S1104 in FIG. 11).

When it is determined YES at step S1104, CPU 102 returns to step S1101 and performs the first hierarchical discriminating-device generating process with respect to the category of the new class, again.

When it is determined that there is no category corresponding to the class to be processed, and determined NO at step 1104, then, CPU 102 finishes the discriminating-device generating process (step S705 in FIG. 7).

Figure 12:
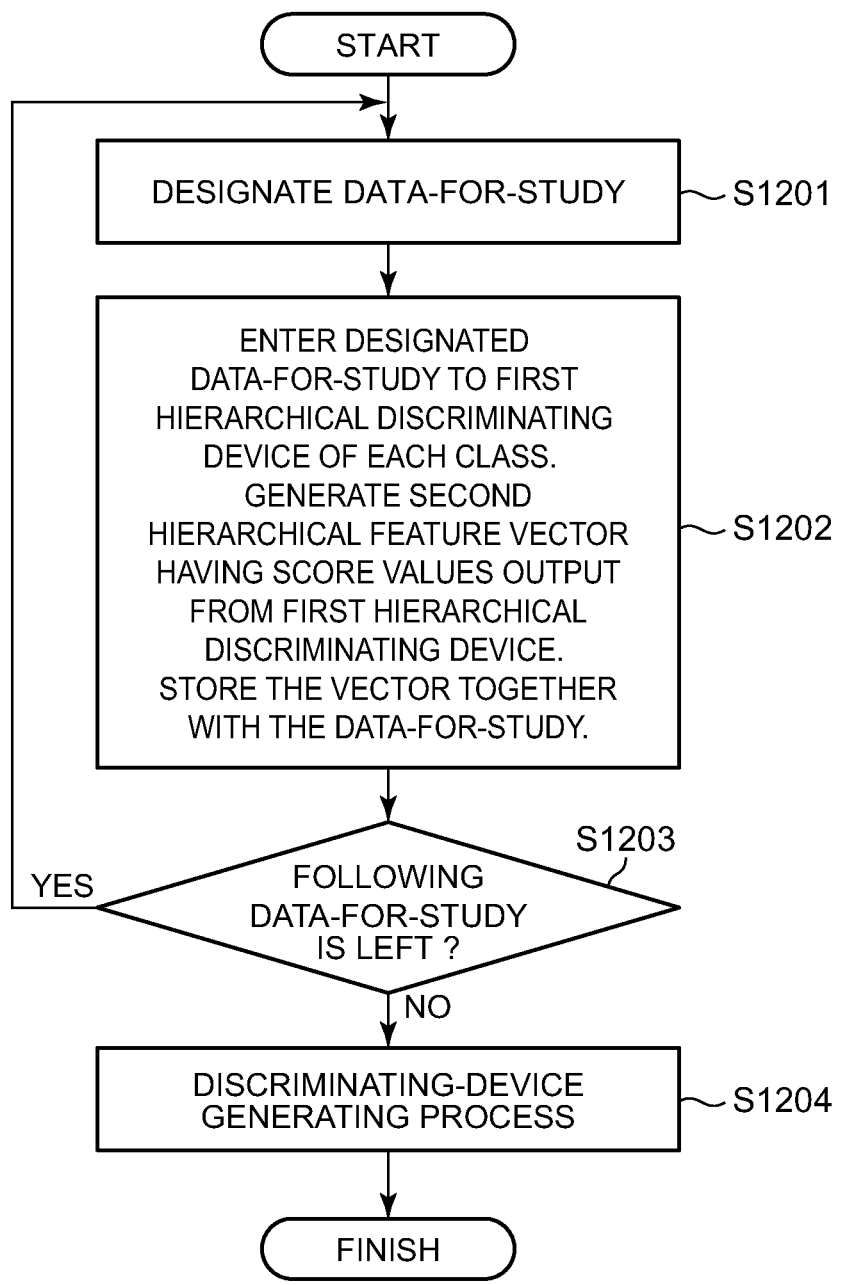
FIG. 12 is a flow chart showing a second hierarchical discriminating-device generating process (FIG. 2) in detail.

FIG. 12 is a flow chart showing the second hierarchical discriminating-device generating process (step S203 in FIG. 2) in detail.

In the second hierarchical discriminating-device generating process, the data-for-study stored in RAM 104 of FIG. 1 is designated one piece by one piece at step S1201 in FIG. 12, and a process is repeatedly performed at step S1202 until it is determined at step S1203 that there is left no following data-for-study to be processed.

The data-for-study designated at step S1201 in FIG. 12 is entered to the first hierarchical discriminating device 302 generated at step S202 in FIG. 2 (step S1202 in FIG. 12). A second hierarchical feature vector (303 in FIG. 3) having score values output from the first hierarchical discriminating device 302 as its elements is generated and stored in RAM 104 in association with the data-for-study designated at step S1201.

When the processes have been repeatedly performed at step 1201 to step S1203, plural second hierarchical feature vectors corresponding respectively to plural pieces of data-for-study stored in RAM 104 are obtained and stored in RAM 104. Thereafter, in the process at step S1204, a first group of the second hierarchical feature vectors corresponding to the data-for-study attached with a label indicating one class is read from among the second hierarchical feature vectors stored in RAM 104. And, a second group of the second hierarchical feature vectors corresponding to the data-for-study attached with a label indicating a class other than said one class is read from RAM 104. Based on the two groups of the second hierarchical feature vectors, the second hierarchical discriminating device corresponding to said one class is generated, which device outputs the maximum score value, when data belonging to said one class is entered. This process is performed with respect to each of the plural classes, and as a result, plural second hierarchical discriminating devices (304 (#1 to #4) in FIG. 3) are generated, which devices judge whether the features represented respectively by plural pieces of data-for-study belong to the plural classes, respectively.

The discriminating device generating process at step S1204 is substantially the same as the discriminating device generating process at step S705 in FIG. 7, the detail of which has been described with reference to the flow chart of FIG. 11. In the description of the discriminating device generating process at step S1204 in FIG. 12, the terms "the "first hierarchical feature vector" and "the first hierarchical discriminating device" (step S705 in FIG. 7) shall be replaced with the second hierarchical feature vector and the second hierarchical discriminating device, respectively.

In short, one category indicating one class to be discriminated among plural classes is designated (step S1101 in FIG. 11).

Then, the positive and negative data corresponding to the current category are entered for discriminating one from others. For instance, in the case where the category is a sort of flowers, the data-for-study attached with the label indicating one class corresponding to the sort of the flowers, designated at step S1101 is defined as the positive data. The data-for-study attached with the label indicating a class other than said one class is defined as the negative data. The second hierarchical feature vectors corresponding to the data-for-study defined as the positive data, which feature vectors have been obtained in the processes at step S1201 and 1203 in FIG. 12, are read from RAM 104 and used as the first group of vectors. The second hierarchical feature vectors corresponding to the data-for-study defined as the negative data, which feature vectors have been obtained in the processes at step S1201 to step 1203 in FIG. 12, are read from RAM 104 and used as the second group of vectors (step S1102 in FIG. 11).

Based on the first and second groups of the second hierarchical feature vectors obtained at step S1102, parameters for discriminating one from others in the second hierarchical discriminating device of one class are calculated, such that the second hierarchical discriminating device of said one class outputs the maximum score value, when data is entered, belonging to said one class corresponding to a category designated at step S1101 to be discriminated (step S1103 in FIG. 11).

In other words, it is presumed that the second hierarchical feature vector given by the following mathematical expression (3) is entered in such second hierarchical discriminating device. In the mathematical expression (3), $X_1, X_2, X_3$ and $X_4$ are score values output from the first hierarchical discriminating devices (#1, #2, #3 and #4) (which corresponds to 302 (#1, #2, #3 and #4) in FIG. 3), respectively.

$$\text{Second hierarchical feature vector} = (X_1, X_2, X_3, X_4) \quad (3)$$

As shown in the following mathematical expression (4), the elements $X_1, X_2, X_3, X_4$ of the feature vector of the mathematical expression (3) are multiplied by weights $C_1, C_2, C_3$ and $C_4$, respectively, and the total sum of the respective products is obtained as the score value F(x) of the first hierarchical discriminating device.

$$F(x) = C_1 X_1 + C_2 X_2 + C_3 X_3 + C_4 X_4 \quad (4)$$

In the calculation of the parameters at step S1103, the above weights $C_1, C_2, C_3$ and $C_4$ are calculated such that, when the first group of the second hierarchical feature vector is entered to the second hierarchical discriminating device, said second hierarchical discriminating device outputs the maximum scour value and when the second group of the second hierarchical feature vector is entered to the second hierarchical discriminating device, said second hierarchical discriminating device output the scour value, which is as small as possible. To calculate the weights $C_1, C_2, C_3$ and $C_4$, the publicly well known technique can be employed, such as the so-called "linear discriminant analysis" used by linear classifiers in the field of machine learning.

Using the calculated weights $C_2, C_2, C_3$ and $C_4$, the second hierarchical discriminating device operates the above mathematical expression (4) to output the score value F(x).

Then, CPU 102 judges whether a category corresponding to the following class has been designated (step S1104 in FIG. 11).

When it is determined YES at step S1104, CPU 102 returns to step S1101 and performs the second hierarchical discriminating-device generating process with respect to the category of the new class.

When it is determined that there is no category corresponding to the class to be processed, and determined NO at step 1104, CPU 102 finishes the discriminating-device generating process (step S705 in FIG. 7).

The following mathematical expression (5) is an example of the score value output from the second hierarchical discriminating device 304 (#2) for discriminating the morning glories from others, which is generated based on the mathematical expression (4), wherein the mathematical expression (4) shows the score value output from the first hierarchical discriminating device 302 (#1 to #4) shown in FIG. 3 and given in the table of FIG. 5.

$$F(x) = 0.8X_1 + 0.9X_2 + 0.5X_3 - 0.5X_4 \quad (5)$$

The following mathematical expression (6) is an example of the score value output from the second hierarchical discriminating device 304 (#1) (FIG. 3) for discriminating the bindweeds from others, which is generated based on the mathematical expression (4), and given in the table of FIG. 5.

$$F(x) = 0.9X_1 + 0.8X_2 - 0.5X_3 - 0.5X_4 \quad (6)$$

As will be understood from the mathematical expressions (5) and (6), the weight $C_3$ in the cost function F(X) composing the discriminating device can be made greatly different between the second hierarchical discriminating device 304 (#3) for discriminating the Asiatic day flowers from others and the second hierarchical discriminating device 304 (#2) for discriminating the morning glories from others, wherein the weight $C_3$ corresponds to a weight, by which the score value $X_3$ output from the first hierarchical discriminating device 302 (#3) for discriminating the Asiatic day flowers from others is weighted. Accordingly, using the score value output from the first hierarchical discriminating device 302 (#3) for discriminating the Asiatic day flowers from others, discriminating accuracies can be uniformized, of the second hierarchical discriminating device 304 (#1) for discriminating the bindweeds from others and the second hierarchical discriminating device 304 (#2) for discriminating the morning glories from others.

As have been described above, the multi-class discriminating device 101 according to the present embodiment of the invention comprises the two-hierarchy configuration, having the first hierarchical discriminating device 302 and the second hierarchical discriminating device 304, as shown in FIG. 3. In the multi-class discriminating device 101, the second hierarchical feature vector 303 is generated based on all the score values output from the first hierarchical discriminating device 302 and the second hierarchical discriminating device 304 refers to the generated second hierarchical feature vector 303 to effect the discriminating operation. Therefore, even if, one discriminating device in the first hierarchical discriminating device 302 should be inferior in discriminating capability, the second hierarchical discriminating device 304 can make an adjustment, referring to the score values output from the other first hierarchical discriminating devices 302. Therefore, even if only a small number of pieces of data-for-study are prepared in each class, the score values output respectively from the first hierarchical discriminating devices 302 of each class are comprehensively evaluated in the multi-class discriminating device 101, whereby its discriminating capability is prevented from reducing and the discriminating capability of the second hierarchical discriminating device 304 of each class can be normalized.

In the embodiment of the invention, the images of flowers are described as the objects to be discriminated but it will be understood that the invention is not limited to the particular embodiments described herein. In the process of extracting features information from image data, a method of clipping an area of a flower from a flower image using a so-called Graph-Cuts and extracting feature information of the flower image can be used in addition to the method of BOF (Bag Of Feature). Other various methods of extracting feature information can be employed in the present invention.

In the embodiment of the invention, the discrimination has been described, taking an example of the flower images. The invention is not limited to the images, but the present invention can be applied to discriminate audio data and other data group having specific features. For instance, when the multi-classification is required in the field of machine learning, the discriminating capabilities can be normalized between the classes.

What is claimed is:

1. A multi-class discriminating device, for judging which class out of plural classes a feature represented by data falls into, comprising:
a first hierarchical discriminating-device generating unit for generating plural first hierarchical discriminating devices each for discriminating one class from N classes, where N is greater than or equal to 2; and
a second hierarchical discriminating-device generating unit for combining score values output respectively from the plural first hierarchical discriminating devices to generate a second hierarchical feature vector, and for entering the second hierarchical feature vector to generate plural second hierarchical discriminating devices each for discriminating one class from N classes, where N is greater than or equal to 2,
wherein when data is entered, the plural first hierarchical discriminating devices output score values respectively, and these score values are combined to generate the second hierarchical feature vector, and when the second hierarchical feature vector is entered, the second hierarchical discriminating device which outputs the maximum score value is selected from among the plural second hierarchical discriminating devices, and the class corresponding to the selected second hierarchical discriminating device is discriminated as the class, into which the feature represented by the entered data falls.

2. The multi-class discriminating device according to claim 1, wherein:
the first hierarchical discriminating-device generating unit performs, with respect to each of the plural classes, a first hierarchical discriminating-device generating process for generating the first hierarchical discriminating device, which judges which one of the plural classes the features represented by plural pieces of data-for-study fall into, when the first hierarchical feature vectors extracted respectively from the plural pieces of data-for-study are entered, thereby generating plural first hierarchical discriminating devices, which judge whether the features represented respectively by the plural pieces of data-for-study fall into the plural classes, respectively, and
the second hierarchical discriminating-device generating unit performs, with respect to each of the plural classes, a process for entering the plural pieces of data-for-study to the first hierarchical discriminating devices of respective classes, and combining the score values output respectively from the first hierarchical discriminating devices to generate the second hierarchical feature vectors relating to the respective pieces of data-for-study, and further entering the second hierarchical feature vectors to generate the second hierarchical discriminating device, which judges whether the features represented respectively by the plural pieces of data-for-study corresponding to the second hierarchical feature vectors fall into one of the plural classes, thereby generating plural second hierarchical discriminating devices, which judge whether the features represented respectively by the plural pieces of data-for-study fall into the plural classes, respectively.

3. The multi-class discriminating device according to claim 2, wherein:
the feature is a feature represented by an image, and
the first hierarchical discriminating-device generating unit performs:
a feature extracting process on each of the plural pieces of data-for-study, for extracting plural pieces of feature information corresponding respectively to grids on an image represented by the data-for-study;
a clustering process for clustering the plural pieces of feature information extracted from the grids on all the images represented by all the pieces of data-for-study into plural clusters;
a vector quantizing process for calculating a distance between each of the plural piece of feature information extracted from the grids on all the images represented by the data-for-study and centroid data of each of the plural clusters, selecting the cluster corresponding to the shortest distance among the calculated distances as the closest cluster, and employing the centroid data of the selected cluster as a vector quantized value of the feature information;
a first hierarchical feature-vector generating process on each of the plural pieces of data-for-study, for repeatedly accumulating a histogram frequency of the closest cluster corresponding to each of the vector quantized values employed with respect to the grids on the image represented by the data-for-study to generate a histogram corresponding to the data-for-study, and generating the first hierarchical feature vector having the histogram frequencies of respective bins in the generated histogram as its element values, thereby storing the first hierarchical feature vector together with a label attached to the data-for-study and indicating the class of the feature represented by the data-for-study; and
a discriminating-device generating process for performing, every plural classes, a process for generating, based on a first group of the first hierarchical feature vectors attached with a label indicating the one class and a second group of the first hierarchical feature vectors attached with a label indicating a class other than the one class, the first hierarchical discriminating device corresponding to the one class, which outputs the maximum score value when data falling in the one class is entered, thereby generating plural first hierarchical discriminating devices, which judge whether the features represented respectively by the plural pieces of data-for-study fall into the plural classes, respectively.

4. The multi-class discriminating device according to claim 3, wherein:
the feature information is information concerning to color and texture; and
in the clustering process, the clustering is performed with respect to information of color independently of information of texture and vice versa; and
in the vector quantizing process, a vector quantized value of color and a vector quantized value of texture are extracted respectively from a cluster of color and a cluster of texture obtained in the clustering; and
in the first hierarchical feature-vector generating process, the histogram of color and the histogram of texture are generated respectively from the vector quantized values of color and the vector quantized values of texture, and the first hierarchical feature vector is generated, having histogram frequencies of respective bins in the histogram of color and histogram frequencies of respective bins in the histogram of texture in combination as its element values.

5. The multi-class discriminating device according to claim 2, wherein:
the second hierarchical discriminating-device generating unit generates the second hierarchical discriminating device corresponding to the one class, which outputs the maximum score value when data falling in the one class is entered, based on a first group of the second hierarchical feature vectors extracted from the data-for-study attached with a label indicating the one class and a second group of the second hierarchical feature vectors extracted from the data-for-study attached with a label indicating a class other than the one class.

6. A data discriminating device for judging which class out of plural classes a feature represented by data falls into, comprising:
plural first hierarchical discriminating devices each for discriminating one class from N classes, where N is greater than or equal to 2;
a second hierarchical feature-vector generating unit for combining score values output respectively from the plural first hierarchical discriminating devices to generate a second hierarchical feature vector; and
plural second hierarchical discriminating devices each for discriminating one class from N classes, where N is greater than or equal to 2, when the second hierarchical feature vector is entered,
wherein when data is entered, the plural first hierarchical discriminating devices output score values respectively, and the second hierarchical feature-vector generating unit combines the score values to generate the second hierarchical feature vector, and when the second hierarchical feature vector is entered, the second hierarchical discriminating device which outputs the maximum score value is selected from among the plural second hierarchical discriminating devices, and the class corresponding to the selected second hierarchical discriminating device is discriminated as the class, into which the feature represented by the entered data falls.

7. A multi-class discriminating method of judging which class out of plural classes a feature represented by data falls into, comprising:
a step of generating plural first hierarchical discriminating devices for discriminating one class from N classes, where N is greater than or equal to 2; and
a step of combining score values output respectively from the plural first hierarchical discriminating devices to generate a second hierarchical feature vector, and entering the second hierarchical feature vector to generate plural second hierarchical discriminating devices for discriminating one class from N classes, where N is greater than or equal to 2,
wherein when data is entered, the plural first hierarchical discriminating devices output score values respectively, and these score values are combined to generate the second hierarchical feature vector, and when the second hierarchical feature vector is entered, the second hierarchical discriminating device which outputs the maximum score value is selected from among the plural second hierarchical discriminating devices, and the class corresponding to the selected second hierarchical discriminating device is discriminated as the class, into which the feature represented by the entered data falls.

8. A data discriminating method of judging which class out of plural classes a feature represented by data falls into, comprising:
plural first hierarchical discriminating steps for discriminating one class from N classes, where N is greater than or equal to 2;
a step of combining score values output respectively at the plural first hierarchical discriminating steps to generate a second hierarchical feature vector; and
plural second hierarchical discriminating steps for discriminating one class from N classes, where N is greater than or equal to 2, when the second hierarchical feature vector is entered,
wherein when data is entered, score values are generated respectively at the plural first hierarchical discriminating steps, and the score values are combined at the second hierarchical feature-vector generating step to generate the second hierarchical feature vector, and when the second hierarchical feature vector is entered, the second hierarchical discriminating step, at which the maximum score value is output, is selected from among the plural second hierarchical discriminating steps, and the class corresponding to the selected second hierarchical discriminating step is discriminated as the class, into which the feature represented by the entered data falls.

9. A non-transitory computer-readable recording medium with a computer program stored thereon, wherein the computer program, when installed on a computer, controls the computer to function as a multi-class discriminating device, for judging which class out of plural classes a feature represented by data falls into, which device comprises:
a first hierarchical discriminating-device generating unit for generating plural first hierarchical discriminating devices each for discriminating one class from N classes, where N is greater than or equal to 2; and
a second hierarchical discriminating-device generating unit for combining score values output respectively from the plural first hierarchical discriminating devices to generate a second hierarchical feature vector, and for entering the second hierarchical feature vector to generate plural second hierarchical discriminating devices each for discriminating one class from N classes, where N is greater than or equal to 2,
wherein when data is entered, the plural first hierarchical discriminating devices output score values respectively, and these score values are combined to generate the second hierarchical feature vector, and when the second hierarchical feature vector is entered, the second hierarchical discriminating device which outputs the maximum score value is selected from among the plural second hierarchical discriminating devices, and the class corresponding to the selected second hierarchical discriminating device is discriminated as the class, into which the feature represented by the entered data falls.

10. A non-transitory computer-readable recording medium with a computer program stored thereon, wherein the computer program, when installed on a computer, controls the computer to function as a data discriminating device for judging which class out of plural classes a feature represented by data falls into, which device comprises:

plural first hierarchical discriminating devices each for discriminating one class from N classes, where N is greater than or equal to 2;

a second hierarchical feature-vector generating unit for combining score values output respectively from the plural first hierarchical discriminating devices to generate a second hierarchical feature vector; and plural second hierarchical discriminating devices each for discriminating one class from N classes, where N is greater than or equal to 2, when the second hierarchical feature vector is entered, wherein when data is entered, the plural first hierarchical discriminating devices output score values respectively, and the second hierarchical feature-vector generating unit combines the score values to generate the second hierarchical feature vector, and when the second hierarchical feature vector is entered, the second hierarchical discriminating device which outputs the maximum score value is selected from among the plural second hierarchical discriminating devices, and the class corresponding to the selected second hierarchical discriminating device is discriminated as the class, into which the feature represented by the entered data falls.

* * * * *